(12) United States Patent
Doerr

(10) Patent No.: US 10,097,271 B2
(45) Date of Patent: Oct. 9, 2018

(54) MULTICHANNEL COHERENT TRANSCEIVER AND RELATED APPARATUS AND METHODS

(71) Applicant: Acacia Communications, Inc., Maynard, MA (US)

(72) Inventor: Christopher Doerr, Middleton, NJ (US)

(73) Assignee: Acacia Communications, Inc., Maynard, MA (US)

( * ) Notice: Subject to any disclaimer, the term of this patent is extended or adjusted under 35 U.S.C. 154(b) by 182 days.

(21) Appl. No.: 14/796,390

(22) Filed: Jul. 10, 2015

(65) Prior Publication Data

US 2016/0013866 A1 Jan. 14, 2016

Related U.S. Application Data

(60) Provisional application No. 62/023,505, filed on Jul. 11, 2014.

(51) Int. Cl.
| | |
|---|---|
| *H04B 10/61* | (2013.01) |
| *H04B 10/40* | (2013.01) |
| *G02B 6/42* | (2006.01) |
| *G02B 6/43* | (2006.01) |
| *H04B 10/69* | (2013.01) |

(52) U.S. Cl.
CPC ............ *H04B 10/40* (2013.01); *G02B 6/42* (2013.01); *G02B 6/43* (2013.01); *H04B 10/61* (2013.01); *H04B 10/69* (2013.01)

(58) Field of Classification Search
CPC .. G02B 6/4246; G02B 6/4214; G02B 6/4292; H04B 10/40; H04B 10/152
See application file for complete search history.

(56) References Cited

U.S. PATENT DOCUMENTS

| | | | |
|---|---|---|---|
| 9,195,079 B2 | 11/2015 | Doerr et al. | |
| 2003/0214991 A1* | 11/2003 | Wiedmann | H01S 5/026 372/50.12 |
| 2013/0308898 A1 | 11/2013 | Doerr et al. | |
| 2014/0064659 A1 | 3/2014 | Doerr et al. | |
| 2014/0153601 A1 | 6/2014 | Doerr et al. | |
| 2014/0153931 A1 | 6/2014 | Doerr et al. | |
| 2014/0376001 A1* | 12/2014 | Swanson | A61B 5/0066 356/479 |
| 2015/0023672 A1* | 1/2015 | Dai | H04B 10/572 398/182 |

FOREIGN PATENT DOCUMENTS

CN 102483488 A 5/2012

OTHER PUBLICATIONS

PCT/US2015/039963, Jan. 26, 2017, International Preliminary Report on Patentability.

(Continued)

*Primary Examiner* — Ted Wang
(74) *Attorney, Agent, or Firm* — Wolf, Greenfield & Sacks, P.C.

(57) ABSTRACT

A multi-channel optical transceiver is disclosed. The optical transceiver has a multi-package structure. A laser array is disposed in one package. An application specific integrated circuit (ASIC) and photonic integrated circuit (PIC) are disposed in another package. An optical fiber array may couple the first package and second package together.

11 Claims, 9 Drawing Sheets

(56) References Cited

OTHER PUBLICATIONS

PCT/US2015/039963, Oct. 20, 2015, Invitation to Pay Additional Fees.
Invitation to Pay Additional Fees dated Oct. 20, 2015 for Application No. PCT/US2015/039963.
Kish et al., 500 Gb/s and beyond photonic integrated circuit module transmitters and receivers. OFC 2014. Opt Soc Am. Mar. 9, 2014. 3 pages.
International Search Report and Written Opinion dated Jan. 14, 2016 for Application No. PCT/US2015/039963.
Corzine et al., 10-Channel x 40Gb/s per channel DQPSK Monolithically Integrated InP-based Transmitter PIC. Optical Fiber Communication Conference/National Fiber Optic Engineers Conference 2008, San Diego, CA. Paper PDP18. Feb. 24-28, 2008. 3 pages.
Nagarajan et al., 10 Channel, 100Gbit/s per Channel, Dual Polarization, Coherent QPSK, Monolithic InP Receiver Photonic Integrated Circuit. Optical Fiber Communication Conference. Los Angeles, CA. Mar. 6-10, 2011. Paper OML7. doi: 10.1364/OFC.2011.OML7. 3 pages.
PCT/US2015/039963, Jan. 14, 2016, International Search Report and Written Opinion.
International Preliminary Report on Patentability dated Jan. 26, 2017 for Application No. PCT/US2015/039963.

\* cited by examiner

MULTICHANNEL COHERENT TRANSCEIVER AND RELATED APPARATUS AND METHODS

RELATED APPLICATIONS

The present application claims the benefit under 35 U.S.C. § 119(e) of U.S. Provisional Patent Application Ser. No. 62/023,505 entitled "MULTICHANNEL COHERENT ASIC AND PIC INTEGRATION," filed Jul. 11, 2014, which is incorporated herein by reference in its entirety.

BACKGROUND

Field

The present application relates to multi-channel coherent transceivers and related apparatus and methods.

Related Art

Coherent transceivers include various components. A laser, transmit and receive circuitry, and one or more application specific integrated circuits (ASICs) are sometimes included. The transmit circuitry is sometimes formed as a photonic integrated circuit (PIC), as is the receive circuitry.

BRIEF SUMMARY

According to an aspect of the present application, a multi-channel coherent transceiver is provided, comprising a first package, a multi-core application specific integrated circuit (ASIC) disposed within the first package, a multi-channel transmitter or receiver photonic integrated circuit (PIC) disposed within the first package and coupled to the multi-core ASIC, and a second package comprising a tunable laser array. The multi-channel coherent transceiver further comprises an optical fiber array comprising multiple optical fibers coupling the first package with the second package.

According to an aspect of the present application, an apparatus is provided, comprising a package, an application specific integrated circuit (ASIC) on a first semiconductor chip disposed within the package, the first semiconductor chip having first, second, and third edges, and a transmitter or receiver photonic integrated circuit (PIC) on a second semiconductor chip disposed within the package and coupled to the ASIC. The ASIC comprises receive circuitry or transmit circuitry electrically coupled to the second semiconductor chip and adjacent at least two of the first, second, and third edges of the first semiconductor chip.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application relate to configurations for co-packaging the various components of a multi-channel coherent transceiver. According to one aspect of the present application, a multi-package configuration is provided, in which a tunable laser array is in one package and a PIC having transmit and/or receive circuitry is packaged separately. The package including the PIC may also include an ASIC and, in some embodiments, amplifier chips (e.g., chips containing trans-impedance amplifiers (TIAs) or driver amplifiers). The packages may be interconnected by an optical fiber (or "fiber optic") array, which in some embodiments may be detachable from the package housing the PIC and/or ASIC.

According to an aspect of the present application, an ASIC and a PIC having transmit and/or receive circuitry may be packaged together as part of a coherent transceiver, and separate from a laser array of the coherent transceiver. The ASIC and the PIC may be on separate chips. The ASIC may include transmit circuitry, such as high-speed digital-to-analog converters (DACs), and receive circuitry, such as high-speed analog-to-digital converters (ADCs). One of the two types of circuitry, the receive circuitry or the transmit circuitry, may be arranged along an edge of the ASIC adjacent an edge of the PIC. The other type of circuitry may be arranged along two edges of the ASIC, with these two edges being, in some embodiments, substantially perpendicular to the edge of the ASIC adjacent the PIC. In some such embodiments, the receive circuitry of the ASIC may be the circuitry arranged along two (or more) edges.

The aspects and embodiments described above, as well as additional aspects and embodiments, are described further below. These aspects and/or embodiments may be used individually, all together, or in any combination of two or more, as the application is not limited in this respect.

Figure 1:
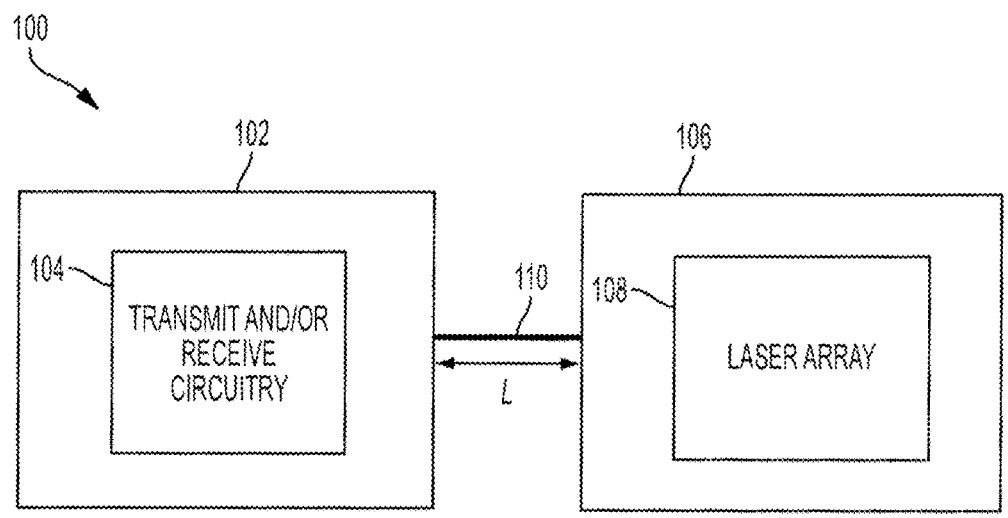
FIG. 1 illustrates a multi-package multi-channel coherent transceiver, according to a non-limiting embodiment of the present application.

As described above, an aspect of the present application provides a multi-package configuration of a multi-channel coherent transceiver, in which a laser array is in one package and a PIC having transmit and/or receive circuitry is packaged separately. FIG. 1 illustrates a non-limiting example of such a configuration. As shown, the transceiver 100 includes a first package 102 in which is packaged transmit and/or receive circuitry 104. The transceiver 100 further comprises a second package 106 in which is packaged a laser array 108. The first package 102 and second package 106 are connected by an optical coupler (or connector) 110 having a length L.

The transmit and/or receive circuitry 104 may include optical circuitry, such as silicon photonics transmit and/or receive circuitry. Thus, in some embodiments the transmit and/or receive circuitry 104 may be implemented as a PIC. In some embodiments, as described further below in connection with FIG. 2, the transmit and/or receive circuitry 104 may include a single-chip multi-channel PIC transmitter and receiver.

The transmit and/or receive circuitry 104 may further comprise an ASIC. In some embodiments, the ASIC contains a real-time digital signal processor (DSP) for processing the transmitted and received signals. The ASIC may contain circuitry to produce and receive advanced transmission formats, such as quadrature phase-shift keying (QPSK) or quadrature amplitude modulation (QAM). The ASIC may include high-speed ADCs and/or DACs. In some embodiments, the ASIC may be a CMOS ASIC. The ASIC may be on a separate chip from any optical transmit or receive circuitry, with an example of such a configuration being shown in FIG. 2.

The first package 102 for packaging the transmit and/or receive circuitry 104 may be a plastic package, or may be made of any other suitable material, and may have any suitable shape. The first package 102 need not be hermetic, although it may be in some embodiments.

The laser array 108 packaged by the second package 106 may be a tunable laser array having a number of tunable lasers corresponding to different channels of the transceiver 100. For example, the transceiver 100 may be a four-channel coherent transceiver, and the laser array 108 may include four tunable lasers, each corresponding to a respective channel of the transceiver. Other numbers of channels may be provided, as four represents a non-limiting example, and the aspects described herein apply to smaller and larger numbers of channels. The laser array 108 may be a silicon photonics laser array. In some embodiments, semiconductor optical amplifiers (SOAs) may be provided in connection with the laser array. In some such embodiments, an SOA array may be provided on a separate chip from other components of the lasers within the second package 106. A non-limiting example is described in connection with FIG. 2.

The second package 106 packaging the laser array 108 may be hermetic in at least some embodiments. It may be made of gold (e.g., a hermetic gold box) or other suitable material providing a hermetic seal.

Because the laser array 108 and the transmit and/or receive circuitry 104 are packaged separately according to an aspect of the present application, a suitable optical coupler 110 is provided for carrying optical signals between the two. For instance, the optical coupler 110 may be an optical fiber array coupler, having a plurality of optical fibers configured to carry optical signals between the laser array 108 and the transmit and/or receive circuitry 104. In some embodiments, the optical coupler may include one optical fiber for each channel of the transceiver. The length L of the optical coupler 110 may have a value between approximately 3 cm and 50 cm, between approximately 5 cm and 10 cm, or any value of range of values with such ranges. Other values are also possible. It may be desirable in some embodiments to minimize the length L to facilitate achieving high quality optical signal transmissions between the two packages 102 and 106 and to minimize packaging size.

As will be described further below in connection with FIG. 2, the optical coupler 110 may be detachable in some embodiments. For example, the optical coupler 110 may be detachable from the first package 102. The detachable nature of the optical coupler 110 may facilitate fabrication of the transceiver 100. For example, certain components of the transceiver 100, such as the first package 102, may be subject to high temperature processing. The optical coupler 110 may be uncoupled from the first package 102 to allow high temperature processing to be performed without destroying the optical coupler 110 and fiber, and may be coupled to the package 102 after the high temperature processing is completed.

Figure 2:
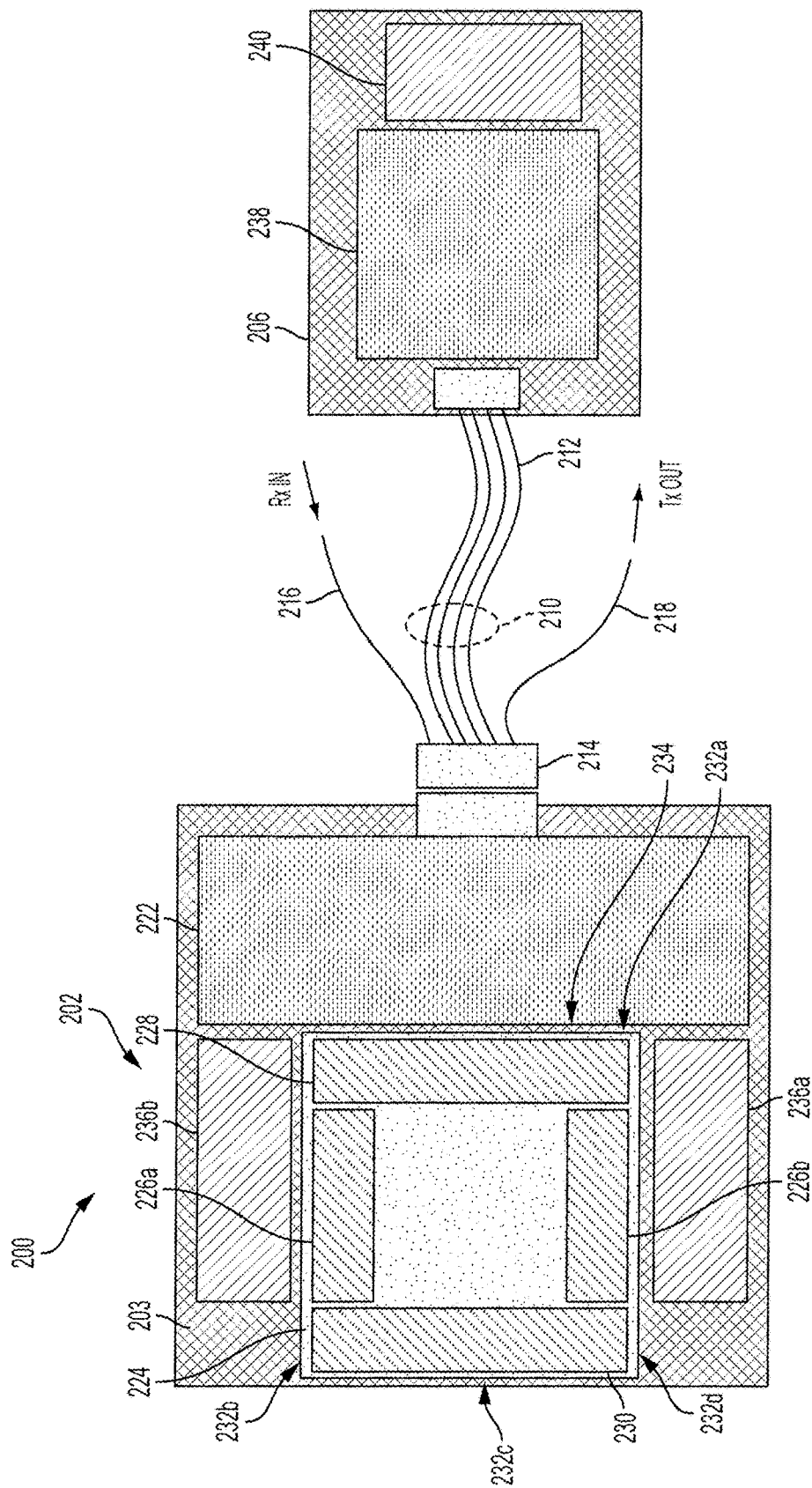
FIG. 2 illustrates an example of an implementation of the multi-package multi-channel coherent transceiver of FIG. 1.

FIG. 2 illustrates an example of an implementation of the multi-package multi-channel coherent transceiver of FIG. 1. The multi-channel coherent transceiver 200 includes a first package 202, a second package 206, and an optical fiber array coupler 210 coupling the first and second packages. The first package may be of the type previously described in connection with first package 102 of FIG. 1, and the second package 206 may be of the type previously described in connection with second package 106 of FIG. 1. The multi-package multi-channel coherent transceiver 200 may support any data rate, such as being a 1 Tb/second transceiver in some embodiments.

The first package 202 packages transmit and receive circuitry. As shown, a silicon photonics transmitter and receiver PIC 222 is provided as a first chip within the first package 202. The PIC 222 may be a multi-channel PIC, for example providing four transmit channels and four receive channels, as a non-limiting example. The PIC 222 may provide any suitable modulation rate, for example being a 40-Gbaud PIC.

An ASIC 224 is also provided within the first package 202 as a separate chip from the PIC 222. In some embodiments, the chip on which the ASIC is formed may be a semiconductor chip. The ASIC 224 may be a multi-core coherent ASIC or any suitable type of ASIC for providing desired functionality of the multi-channel coherent transceiver 200. As a non-limiting example, the ASIC 224 may be a 16QAM CMOS ASIC. In some embodiments, a single ASIC 224 includes all the ASIC channels, rather than dividing ASIC channels among multiple ASICs. The ASIC 224 may include various circuit components, including transmit circuitry such as DACs, receive circuitry such as ADCs, and formatting circuitry. As shown, the ASIC 224 includes ADCs 226a and 226b and DACs 228. In the non-limiting example of FIG. 2, ADCs 226a include eight ADCs, ADCs 226b include eight ADCs, and DACs 228 include sixteen DACs. The ASIC 224 further comprises formatting circuitry 230, such as serializing/deserializing (SerDes) circuitry. The drivers (or driver circuitry) for driving the PIC 222 may be inside the ASIC 224.

As illustrated, in some embodiments in which a transmitter and receiver PIC and an ASIC are disposed within the same package, the ASIC may have an edge (or side) adjacent an edge of the transmitter/receiver PIC. To illustrate the point, it can be seen that ASIC 224 includes four edges 232a, 232b, 232c, and 232d. The PIC 222 includes an edge 234. The PIC 222 and ASIC 224 may be positioned such that the edges 232a and 234 are adjacent. This may be done, for example, to allow for short signal path lengths from the PIC 222 to the ASIC 224.

It should be further appreciated from FIG. 2 that receive circuitry of the ASIC 224, such as ADCs 226a and 226b, may be split between two or more edges of the chip on which the ASIC 224 is formed. For example, ADCs 226a are adjacent edge 232b of the ASIC while ADCs 226b are adjacent the edge 232d. In this configuration, the signal paths from the receive circuitry of the ASIC 224 to the PIC 222 are greater than those of the transmit circuitry (e.g., DACs 228) to the PIC 222. Stated more generally, placing either the transmit circuitry or the receive circuitry of the ASIC 224 on an edge of the ASIC chip not abutting the PIC 222 will result in the signal paths to that circuitry being longer than those of circuitry placed on an edge of the ASIC chip abutting the PIC 222. The inventor has appreciated that in at least some embodiments it may be preferable to place transmit circuitry of the ASIC 224 nearer the PIC 222, thus resulting in the receive circuitry of the ASIC 224 being placed farther from the PIC 222, as in the configuration of FIG. 2. The ASIC 224 may be better suited to correct signal errors in the receive signal path than in the transmit signal path. If there is a bandwidth limitation in the transmitter, it can be difficult to equalize it in the receiver because optical noise may have been already added to the system by the optical amplifiers in the line. If there is a bandwidth limitation in the receiver, by contrast, it can be equalized in the receiver because little to no additional noise is added between the receiver electronics and the DSP. Thus, in some embodiments it is preferable to avoid any bandwidth limitations due to long electrical paths in the transmitter than the receiver. Because such signal errors tend to be less severe the shorter the signal path length, it may be preferable to maintain signal path lengths as short as possible for the transmit circuitry. Thus, the DACs 228 may be disposed adjacent the edge 232a of the ASIC 224 proximate the PIC 222. Likewise, the drivers of the ASIC 224 may be positioned on the edge of the ASIC abutting the PIC 222 to maintain short distances between the drivers and the PIC 222.

The ASIC 224 may optionally include amplification circuitry, such as one or more TIAs. However, in some embodiments it may be desirable for the TIAs to be fabricated in a different material than the ASIC 224, for example to provide better performance of the TIAs than could be achieved if the material of the ASIC was instead used. For example, it may be desirable to fabricate the TIAs in silicon germanium (SiGe). Thus, the TIAs, or other amplification circuitry, may be fabricated on separate chips from the ASIC 224. Accordingly, as shown, TIAs 236a and 236b are provided separately (on separate chips) from the ASIC, and may be formed of a material different than the material used to fabricate the ASIC. Placing the TIAs as shown may avoid the need for radio frequency (RF) transmission lines in the interposer 203, described further below, to connect to the TIAs.

Figure 3:
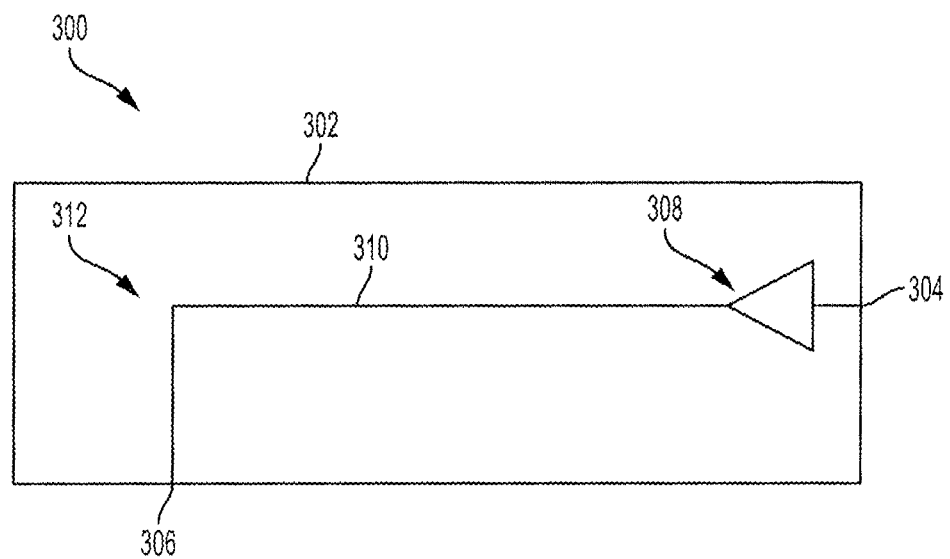
FIG. 3 illustrates circuitry implementing an angled signal path to allow connection of an ASIC with a PIC, according to a non-limiting embodiment of the present application.

A consequence of positioning amplifiers, such as TIAs 236a and 236b, as shown in FIG. 2 is that at least some of the signal paths from the PIC 222 to the ASIC 224 must navigate a turn. In some embodiments, the turn is a 90-degree turn, or right angle. Accordingly, as aspect of the present application provides for circuitry which implements a signal path turn between a PIC and an ASIC of a multi-channel coherent transceiver. FIG. 3 illustrates an example in the context of a TIA.

As shown, the integrated circuit device 300 includes a semiconductor chip 302 having a first port 304 and a second port 306. The first port 304 may be an input for the integrated circuit device 300 configured to be positioned proximate a PIC (e.g., PIC 222 of FIG. 2), while the second port 306 may be an output for the integrated circuit device configured to be positioned proximate an ASIC (e.g., ASIC 224). However, the ports may be reversed in other embodiments. An amplifier 308 may be formed on the chip 302, for example in SiGe technology. The amplifier 308 may be positioned proximate the first port 304, assuming that the first port 304 represents an input port, and distal the second port 306. In this manner, the amplifier 308 may be proximate, and in some embodiments as close as possible to, the PIC from which it receives a signal. It may be preferable for the TIA to be closer to the PIC than the ASIC. A signal line 310, such as a metal trace, may run from the output the amplifier 308 to the second port 306 of the integrated circuit device 300. The signal line 310 may be a 50-Ohm line in some embodiments. As shown, the signal line 310 may implement a turn 312, such as a 90-degree turn. In this manner, the integrated circuit device 300 may be positioned in the manner shown for TIAs 236a or 236b, providing interconnection between the PIC 222 and the ASIC 224.

It should be appreciated that while FIG. 3 provides an example of a TIA implementing a 90-degree signal path turn, other circuit components may instead be used to implement such a feature. Also, while FIG. 3 illustrates a single amplifier on the chip 302 it should be appreciated that more than one may be provided in parallel. For example, eight amplifiers may be implemented on the chip 302 when implementing the TIAs 236b.

Figure 4:
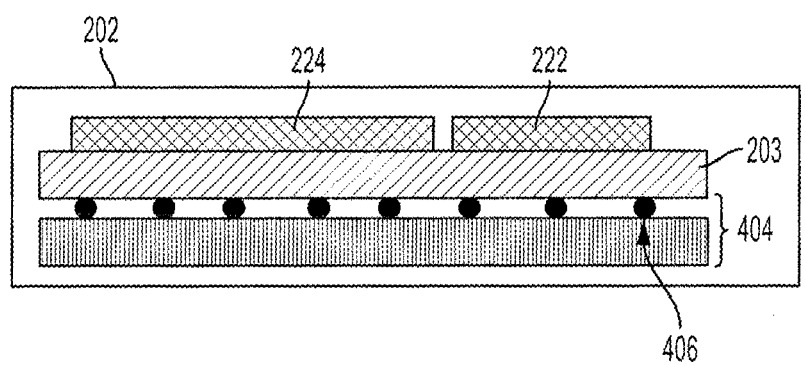
FIG. 4 is a cross-sectional view of an example of a configuration for co-packaging an ASIC and a PIC, according to a non-limiting embodiment of the present application.

The components within the first package 202 may be coupled by an interposer 203 shown in FIG. 2, which may be a silicon interposer. FIG. 4 illustrates a non-limiting example, as a cross-sectional view of the first package 202 taken along a line oriented in the left-right direction of FIG. 2. The PIC 222 and ASIC 224 may be mounted on the interposer 203. The interposer 203 may be connected to a ball grid array (BGA) 404 having solder balls (or bumps) 406. It should be appreciated that not all aspects described herein are limited to the manner of interconnecting the PIC 222 and ASIC 224 illustrated in FIG. 4.

In some embodiments, the first package 202 may have a cooling mechanism provided. The ASIC 224 may consume substantial power, and therefore generate heat. Although silicon photonics may be used for the PIC 222 to provide a degree of thermal insensitivity, it may nonetheless be desirable to cool the components within the package. Various cooling mechanisms may be used, such as a heat sink or a thermoelectric cooler. In some embodiments it may be desirable to use a heat sink, which can be beneficial in terms of reduced cost and complexity compared to other cooling techniques. The use of a heat sink to cool the PIC 222 and ASIC 224 may be facilitated by having the laser array 238, described further below, in a separate package. If, by contrast, the PIC 222, ASIC 224, and laser array 238 were packaged together, a thermoelectric cooler may be needed to provide suitable cooling.

Figure 5:
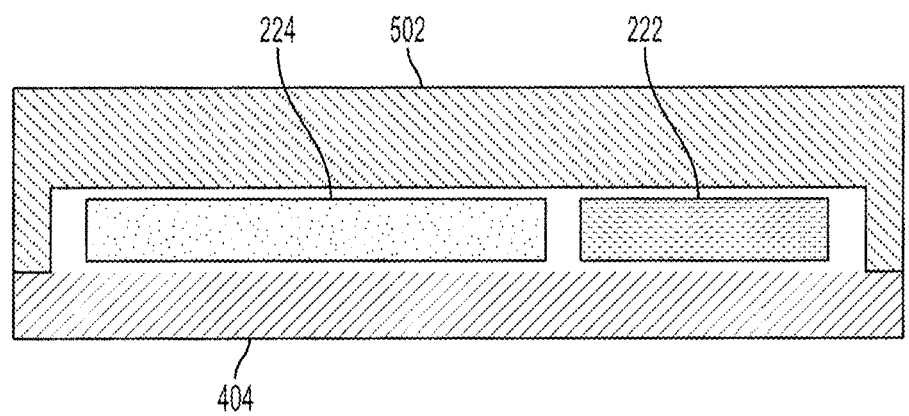
FIG. 5 is a cross-sectional view of a co-packaged ASIC and PIC, together with a heat sink, according to a non-limiting embodiment of the present application.

FIG. 5 illustrates an example of a packaged ASIC and transmitter and receiver PIC coupled to a heat sink. In FIG. 5, the PIC 222 and ASIC 224 are mounted on BGA 404 as in FIG. 4. A heat sink 502 may be thermally coupled to the PIC 222 and ASIC 224, and positioned to at least partially cover them. Optionally, a thermal pad, paste, or other suitable material may be provided between the PIC 222 and the heat sink 502, and between the ASIC 224 and the heat sink 502 to ensure good thermal coupling. This situation is likewise for TIA and driver amplifier chips.

Figure 6A:
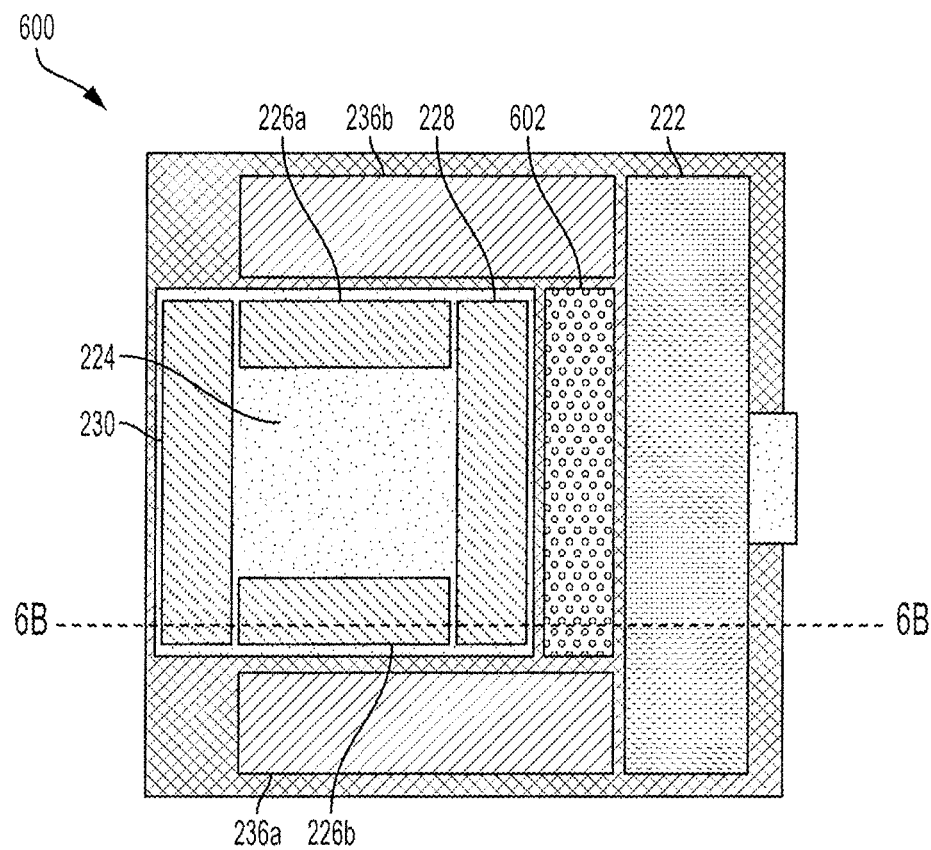
FIG. 6A illustrates an alternative to the co-packaged ASIC and PIC illustrated in FIG. 2 in which driver circuitry is provided on a separate chip, according to a non-limiting embodiment of the present application.

As previously described in connection with FIG. 2, in some embodiments the driver circuitry (or "drivers") are included directly on the ASIC 224. A driver serves to amplify and/or buffer the signal from the DACs. Yet, not all embodiments are limited in this respect. For example, in some embodiments the drivers may be included on a separate driver chip. When this is done, the driver chip may be placed close to, and in some situations as close as possible to, the PIC 222 to allow for short path lengths between the PIC 222 and the drivers. FIG. 6A illustrates an example.

The illustrated device 600 includes various components previously illustrated and described with respect to FIG. 2. Those components are not described again in detail here. The device 600 differs from FIG. 2 in that a separate driver chip 602 is provided. The driver chip 602 may include the drivers for driving the components of the PIC 222. To minimize errors in the transmission signal path of the device 600 it may be desirable to position the drivers close to the PIC 222, thus providing a short distance between the two. Accordingly, as illustrated, the driver chip 602 may be positioned between the ASIC 224 and the PIC 222, and may have an edge abutting the PIC 222. The driver chip 602 may include any suitable driver circuitry, as the various aspects described herein are not limited to the use of any particular type of driver circuitry.

Figure 6B:
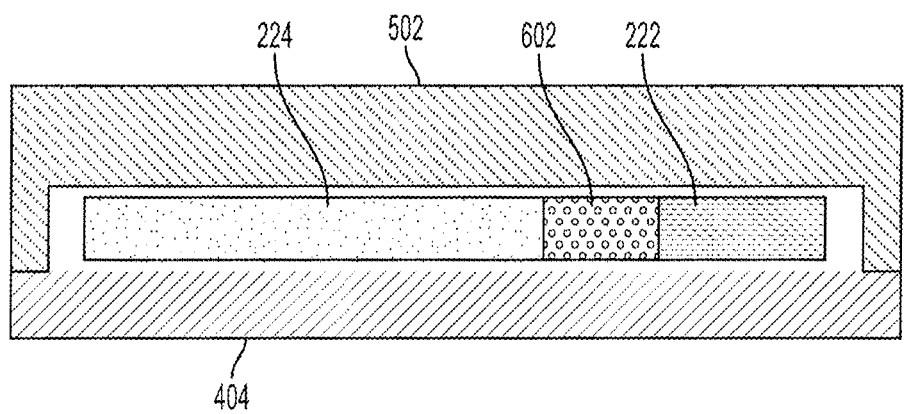
FIG. 6B is a cross-sectional view of the device of FIG. 6A, including a heat sink.

FIG. 6B illustrates a cross-section of the device 600 of FIG. 6A taken along the line 6B-6B. It should be appreciated that FIG. 6B is similar to previously described FIG. 5, the difference being that the device of FIG. 6B includes the driver chip 602 between the PIC 222 and the ASIC 224. The heat sink 502 is included to cool the components and, as shown, may at least partially cover the illustrated components. Although not shown, a thermal pad, paste, or other suitable material may be provided between the PIC 222 and the heat sink 502, between the ASIC 224 and the heat sink 502, and between the driver chip 602 and the heat sink 502, to ensure good thermal coupling.

As shown in FIG. 2, the second package 206 may include a laser array 238, which may be a tunable laser array in some embodiments. In this non-limiting example, the laser array 238 may include four tunable lasers integrated on a single semiconductor (e.g., silicon) chip, and may be implemented as a silicon photonics tunable laser array. The laser array 238 may include wavelength lockers to ensure the laser wavelength accuracy and stability.

An SOA array 240 may also be provided. In some embodiments it may be desirable to form the SOAs from a different material than is used for the laser array, such as indium phosphide (InP). Therefore, the SOA array 240 may be implemented on a separate chip from the laser array. The illustrated configuration may be considered an external cavity tunable laser array because some of the laser components are on one chip and a portion of the laser cavity is on another. Not all embodiments are limited in this respect. Moreover, for simplicity of description, the SOA array 240 is identified separately herein from the laser array 238, although the combination could be considered to compose the laser array.

Figure 7:
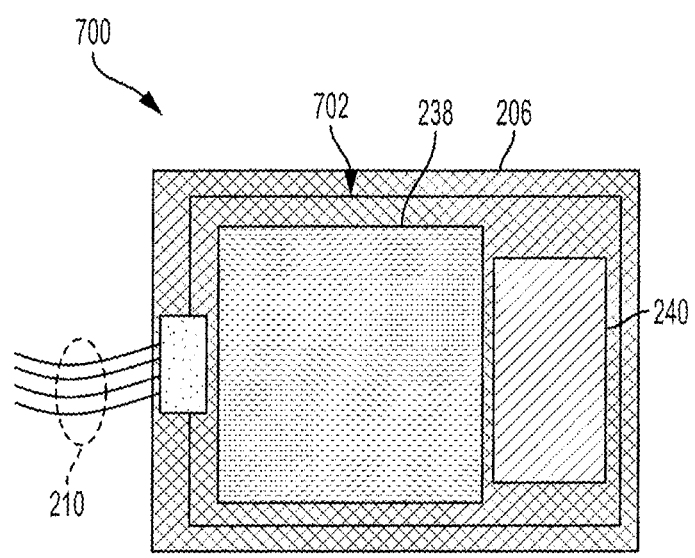
FIG. 7 illustrates an alternative to the co-packaged laser array and semiconductor optical amplifier (SOA) array illustrated in FIG. 2, including a thermo-electric cooler, according to a non-limiting embodiment of the present application.

Cooling may be provided for the laser array 238 of FIG. 2, although that figure does not illustrate a cooling mechanism in the second package 206. For example, a thermoelectric cooler may be provided to cool the laser array 238 and the SOA array 240. An example is illustrated in FIG. 7.

As shown, the device 700 differs from what is shown in FIG. 2 in that a thermoelectric cooler 702 is included within the second package 206. In this embodiment, a single thermoelectric cooler may be shared by the lasers of the laser array 238, thus reducing cost and complexity compared to a situation in which each of the lasers has a respective thermoelectric cooler. Also, because the ASIC 224 and PIC 222 are packaged separately from the laser array 238, the thermoelectric cooler 702 used to cool the lasers may be smaller, and therefore less costly, than it would otherwise be.

From the descriptions of FIGS. 2, 5, 6B, and 7, it should be appreciated that in some embodiments a multi-channel coherent transceiver may include a laser array cooled by a thermoelectric cooler and an ASIC and transmitter and receiver PIC cooled by a heat sink. That is, in some embodiments a co-packaged ASIC and transmitter and receiver PIC may lack a thermoelectric cooler. Such a configuration may provide reduced cost and complexity compared to a scenario requiring a thermoelectric cooler to cool a laser array packaged with an ASIC.

Figure 8:
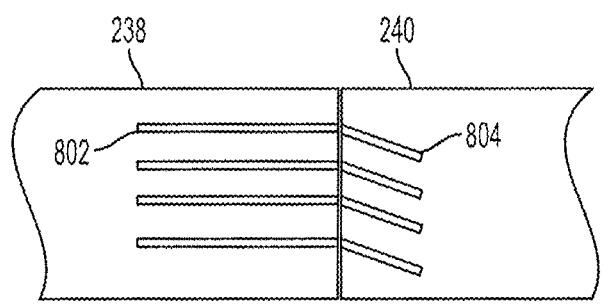
FIG. 8 is a top-down view illustrating the angling of an SOA array on one chip relative to a laser array on another chip, according to a non-limiting embodiment of the present application.

Referring again to FIG. 2, the lasers of the laser array 238 and the SOA array 240 may be aligned to provide suitable transmission of signals between the two chips. In some embodiments, the amplifiers of the SOA array may be angled relative to the lasers to reduce or minimize reflection of optical signals back into the lasers. FIG. 8 illustrates a non-limiting example.

FIG. 8 is a top-down view of a portion of the laser array 238 and SOA array 240. The laser array 238 may include four lasers 802, illustrated in simplified form in FIG. 8. The SOA array 240 may include four SOAs 804, also illustrated in simplified form. As shown, the SOAs 804 may be aligned with, but at an angle relative to, the lasers 802.

Figure 9A:
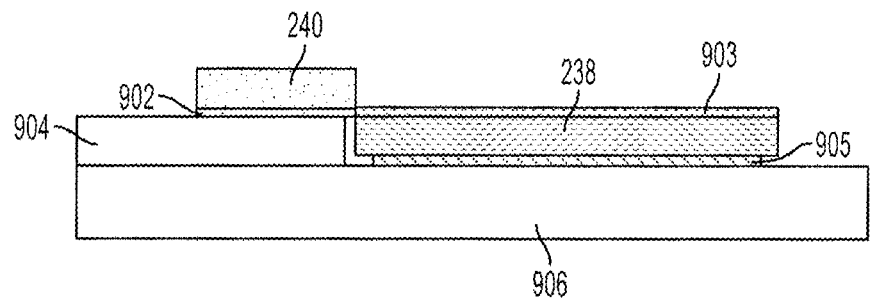
FIGS. 9A-9C depict embodiments in which an SOA array may be formed on a first substrate or semiconductor chip and coupled to a second semiconductor chip having a tunable laser array, according to non-limiting embodiments of the present application.
Figure 9B:
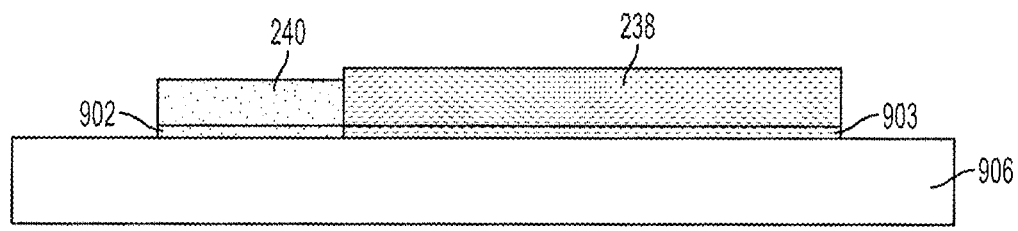
Figure 9C:
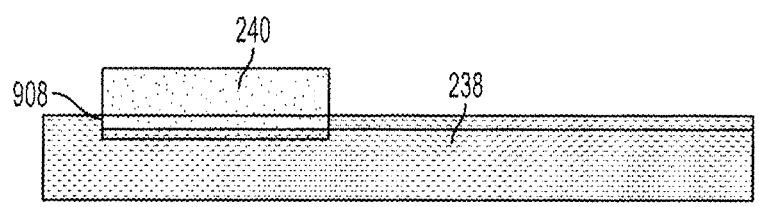

The laser array 238 and SOA array 240 may be aligned relative to each other in various ways. FIGS. 9A-9C illustrate non-limiting examples. In some implementations, the SOA array 240 may be formed on a "process side" or "device side" 902 of a chip. As shown in FIG. 9A, the chip on which the SOA array is fabricated may be flipped and bonded to a first sub-mount 904. Such flip-chip bonding can improve heat dissipation from the SOAs. For example the sub-mount may comprise a material (e.g., aluminum nitride) having higher thermal conductivity than the material of the chip on which the SOA array 240 is formed (e.g., indium phosphide). The first sub-mount 904 may be bonded to a base mount 906. The chip on which the laser array 238 is formed may then be aligned and bonded to the base mount 906. In some embodiments, the tunable laser array components are formed on a process side 903. In some embodiments, the chip on which the tunable laser array 238 is formed may be manipulated with a positioning device to achieve proper alignment to the chip on which the SOA array 240 is formed. A correct alignment may be detected by monitoring optical power transferred from one chip to the other. Once aligned, an epoxy or UV-curable adhesive 905 may be cured to affix the tunable laser array chip and preserve the alignment. Alternatively, solder may be used. In some embodiments, a UV curable adhesive or optical adhesive may additionally be located between the chip supporting the SOA array 240 and the chip supporting the laser array 238 to provide both adhesion and index matching between any optical paths (e.g., waveguides) on each chip.

According to some embodiments, both the chip on which the SOA array 240 is formed and the chip on which the laser array 238 is formed may be flip-chip bonded to a base mount 906, as depicted in FIG. 9B. In some cases, one or both of the chips may be solder bonded or thermocompression bonded (e.g., using bump bonds) to the base mount 906. For example, the solder may be heated before bonding, the chips aligned, and then the solder may be cooled to bond the chips and preserve the alignment. In some embodiments, a UV-curable or optical adhesive may be used additionally between the chips and/or between the chips and base mount 906 to aid in permanently fixing the chips after alignment has been achieved.

According to some implementations, the chip on which the SOA array 240 is formed may be flip-chip bonded to the chip on which the laser array 238 is formed, as depicted in FIG. 9C. According to this embodiment, the chip on which the laser array 238 is formed may include a trench 908 or other receiving feature to receive the chip on which the SOA array 240 is formed. For example, the trench may have a depth between approximately 500 nm and approximately 10 microns, such that optical paths (e.g., waveguides) on the two chips become essentially coplanar when the chips are bonded together. The chips may be aligned and bonded using solder bonding and/or adhesive bonding as described above.

Referring again to FIG. 2, the optical fiber array coupler 210 couples the first package 202 to the second package 206. More specifically, in some embodiments the optical fiber array coupler 210 couples the PIC 222 within the first package 202 to the tunable laser array 238 within the second package 206. Thus, the optical fiber array coupler 210 may carry optical signals between those components.

As shown, the optical fiber array coupler 210 may include a plurality of individual optical fibers 212. In the illustrated embodiment, one optical fiber 212 is provided for each of the lasers of the laser array 238, giving a total of four optical fibers 212. In this embodiment, then, one optical fiber 212 is provided for each channel of the multi-channel coherent transceiver 200. This is in contrast to a design integrating the PIC 222 and laser array 238, in which optical fibers would not need to be provided for each channel to couple the transmit/receive circuitry with the lasers.

The multi-channel coherent transceiver 200 additionally includes a receive optical fiber 216 which receives an optical signal input to the transceiver, as well as a transmit optical fiber 218 which provides an output signal of the transceiver 200. Thus, in some embodiments the multi-channel coherent transceiver may include a plurality of optical fibers including a shared receive optical fiber (or input optical fiber), a shared transmit optical fiber (or output optical fiber), and an optical fiber for each laser channel of the multi-channel coherent transceiver (the laser serving as the transmitter input and the receiver local oscillator). In some embodiments, the receive optical fiber may not be shared, in which case there would be a plurality of receive optical fibers. Likewise the transmit optical fiber may not be shared in some embodiments, in which case there would be a plurality of transmit optical fibers. In some embodiments, then, the number of optical fibers of the transceiver may be between three and fifteen, or any value within that range. More optical fibers may be provided for a greater number of channels.

While not illustrated, there may be an optical isolator in each fiber connecting the laser array to the PIC 222. The optical isolators may prevent back reflections from entering the lasers and causing instabilities.

The optical fiber array coupler 210 may be detachable, or un-pluggable, from the first package 202. In some embodiments, the optical fiber array coupler 210 may be detachable from the second package 206 as well. As shown, the optical fiber array coupler 210 may include an adapter (alternatively referred to herein as a plug or connector) 214 which may be detachably coupled to the first package 202. Such a configuration may allow for connecting and disconnecting the first and second packages 202 and 206. This capability may be helpful, for example to allow the use of various fabrication processes without damaging the optical fiber array coupler 210.

For example, as previously described, the first package 202 may include components mounted on a BGA. Thus, a solder reflow step may be performed in manufacturing the first package 202. Such a process typically involves high temperatures, beyond those to which optical fibers should be exposed. By providing a detachable optical fiber array coupler 210, the optical fiber array coupler 210 may be disconnected from the first package 202 during the solder reflow process, and connected after the solder reflow process is complete.

It should be appreciated from FIG. 2 that the receive optical fiber 216 and transmit optical fiber 218 may share the adapter 214 with the laser optical fibers 212. Thus, the receive optical fiber 216 and the transmit optical fiber 218 may be considered to be part of the optical fiber array 210 in some embodiments.

The aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

According to aspects of the present application, a scalable multi-channel coherent transceiver is provided. By packaging an ASIC together with a transmitter/receiver PIC, the number of radiofrequency (RF) connections is reduced compared to scenarios in which the ASIC(s) and PIC(s) are separately packaged. Thus, RF fidelity between packages does not arise as an issue. Additionally, embodiments of the present application provide for a multichannel coherent transceiver suitable for use in a fiber optic communication system (e.g., a fiber optic network) and having a single ASIC and a single transmitter and receiver PIC. The transceivers described herein may be scaled to larger numbers of channels more easily than devices having separate packaging of the ASIC(s) and PIC(s).

Aspects of the present application provide simplicity and reduced cost in cooling a multi-channel coherent transceiver. Packaging an ASIC and transmitter/receiver PIC in one package and a laser array in a separate package may allow for use of a relatively inexpensive and simple heat sink to cool to the ASIC and PIC package. A thermoelectric cooler may be used to cool the laser array, but may be smaller, and therefore less costly, than if the laser array was co-packaged with the ASIC.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A multi-channel coherent transceiver, comprising:
   a first package;
   a multi-core application specific integrated circuit (ASIC) disposed within the first package;
   a multi-channel transmitter or receiver photonic integrated circuit (PIC) disposed within the first package and coupled to the multi-core ASIC;
   a second package comprising a tunable laser array; and
   an optical fiber array comprising multiple optical fibers coupling the first package with the second package.

2. The multi-channel coherent transceiver of claim 1, wherein the tunable laser array comprises a first tunable laser and a second tunable laser, and wherein the optical fiber array comprises a first optical fiber coupled to the first tunable laser and a second optical fiber coupled to the second tunable laser.

3. The multi-channel coherent transceiver of claim 2, further comprising a receive optical fiber configured to receive an optical signal input to the multi-channel coherent transceiver, and a transmit optical fiber configured to output from the multi-channel coherent transceiver an output optical signal.

4. The multi-channel coherent transceiver of claim 1, wherein the optical fiber array is detachable from the first package.

5. The multi-channel coherent transceiver of claim 1, wherein the multi-channel transmitter or receiver PIC is a combined multi-channel transmitter and receiver PIC.

6. The multi-channel coherent transceiver of claim 1, wherein the multi-channel transmitter or receiver PIC is a silicon photonics transmitter or receiver.

7. The multi-channel coherent transceiver of claim 1, wherein the second package further comprises a semiconductor optical amplifier (SOA), wherein the tunable laser array is on a first chip and the SOA is on a second chip, and wherein the SOA has a separate submount aligned with the tunable laser array.

8. The multi-channel coherent transceiver of claim 1, further comprising a thermoelectric cooler coupled to the tunable laser array.

9. The multi-channel coherent transceiver of claim 1, wherein the first package is not coupled to a thermoelectric cooler.

10. The multi-channel coherent transceiver of claim 1, wherein both the ASIC and the multi-channel transmitter or receiver PIC are made in silicon.

11. The multi-channel coherent transceiver of claim 1, wherein the multi-channel transmitter or receiver PIC is adjacent to an edge of the ASIC containing one or more digital-to-analog converters (DACs).

* * * * *